UNITED STATES PATENT OFFICE.

LAUNCELOT W. ANDREWS, OF CHICAGO, ILLINOIS.

PROCESS FOR MANUFACTURING OXALATES.

1,281,118.  Specification of Letters Patent.  Patented Oct. 8, 1918.

No Drawing.  Application filed June 5, 1915. Serial No. 32,319.

*To all whom it may concern:*

Be it known that I, LAUNCELOT W. ANDREWS, a citizen of the United States, and a resident of Chicago, Cook county, and State of Illinois, have invented certain new and useful Improvements in Processes for Manufacturing Oxalates, of which the following is a specification.

The invention relates to the manufacture of alkali oxalates from alkali formates. As is well known, sodium or other alkali formate, is converted into oxalate by the action of heat, whereby hydrogen gas is liberated and alkali oxalate produced. It is the present practice to add to sodium (or other alkali) formate used, large amounts of inert substances such as sodium carbonate, sodium oxalate, charcoal powder, etc., or to add small amounts of free alkali, *i. e.*, sodium hydroxid, NaOH, or of potassium hydroxid, KOH. The object of these additions is to increase the yield of oxalate and to secure better regulation and control of the reaction.

The present invention is based on the discovery of the fact that an admixture of a small amount of metallic aluminium or of a suitable aluminium compound to the formate employed in the process has a highly beneficial influence, in that it increases the yield of oxalate, lowers the temperature of the reaction and at the same time avoids the introduction of considerable amounts of extraneous material which would have to be subsequently separated from the product with additional cost for labor.

If metallic aluminium is employed for the purpose referred to, it should by preference be used in the form of a fine powder. Those compounds of aluminium that contain substances having a deleterious action on the conversion of formate into oxalate are not suitable for the purpose contemplated in the present invention, and the same remark is applicable to certain aluminium compounds which are characterized by a high degree of chemical indifference, a high melting point and a high insolubility, such as certain silicates, etc.

The inventor prefers to use an alkali aluminate with or without an addition of finely pulverized aluminium. The amount of aluminate required does not exceed one or two per cent. of the weight of the formate used.

Example I: 500 pounds of sodium formate is intimately mixed with 7 pounds of trisodium aluminate, $Na_3AlO_3$, which may contain moisture or be dry. The mixture is then heated to a suitable temperature, say 380° C., until the reaction is complete. The action proceeds steadily and rapidly, but becomes slower toward the end.

Example II: 500 pounds of sodium formate is intimately mixed with 4 pounds of trisodium aluminate and 2 pounds of finely pulverized aluminium and heated as indicated in Example I. In this case, the reaction progresses more rapidly.

Of the tribasic aluminates and the comminuted aluminium metal, tri-sodium and tri-potassium aluminates are preferably employed in carrying out the present invention since these substances, on account of their high solubility, can be readily recovered from the product by treating the latter with a small amount of water. The aluminate is thus dissolved while the greater part of the difficultly soluble sodium oxalate remains undissolved. Then, after filtration, the filtrate is evaporated to dryness and the dry residue obtained can be used again as catalyzer for subsequent operations. While trisoduim and tripotassium aluminates are thus preferred, the invention contemplates as within its scope, the use of other aluminium compounds such as aluminium hydroxid or aluminium oxid and also, as stated, of finely divided metallic aluminum.

Certain aluminium compounds, however, cannot be used with advantage in the improved process. These are those which contain substances that interfere with or act as anti-catalyzers of the desired reaction, as, for example, nickel or cobalt aluminates.

It is obvious that changes may be made in the details set forth without departure from the essentials of the invention as defined in the claims.

I claim as my invention:—

1. The process of manufacturing oxalates by heating a mixture of formates with a catalyzer containing aluminium as its essential ingredient.

2. The process of manufacturing alkali oxalates which consists in heating alkali formate admixed with a catalyzing aluminium-containing substance.

3. The process of manufacturing an alkali oxalate which consists in heating an alkali formate admixed with alkali aluminate.

4. The process of manufacturing sodium oxalate which consists in heating sodium formate with a trialkali aluminate.

5. The process of manufacturing oxalates, which consists in heating alkali formate admixed with an aluminiferous catalyzer in substantially the proportions set forth.

LAUNCELOT W. ANDREWS.